(12) United States Patent
Moyer

(10) Patent No.: US 7,681,078 B2
(45) Date of Patent: Mar. 16, 2010

(54) DEBUGGING A PROCESSOR THROUGH A RESET EVENT

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 385 days.

(21) Appl. No.: 11/750,739

(22) Filed: May 18, 2007

(65) Prior Publication Data

US 2008/0288808 A1  Nov. 20, 2008

(51) Int. Cl.
*G06F 11/00* (2006.01)
(52) U.S. Cl. ...................................................... 714/23
(58) Field of Classification Search .................. None
See application file for complete search history.

(56) References Cited

U.S. PATENT DOCUMENTS

| 5,850,562 A | 12/1998 | Crump et al. | |
|---|---|---|---|
| 6,708,270 B1 * | 3/2004 | Mayer | 713/1 |
| 6,877,112 B1 | 4/2005 | Iino et al. | |
| 7,051,197 B2 * | 5/2006 | Agarwala et al. | 713/2 |
| 7,444,504 B2 * | 10/2008 | Agarwala et al. | 713/2 |

OTHER PUBLICATIONS

IBM "Book E: Enhanced PowerPC'TM' Architecture," Version 0.99 Mar. 15, 2001.
Freescale Semiconductor, Inc. "e200z6 PowerPC'TM' Core Reference Manual," 2004.

* cited by examiner

*Primary Examiner*—Michael C Maskulinski
(74) *Attorney, Agent, or Firm*—Robert L. King; Susan C. Hill; Ranjeev Singh

(57) ABSTRACT

A method for operating a processor in data processing system comprises: asserting a debug control signal to cause the processor to enter a debug operating mode; initializing a plurality of shared processor resources with debug configuration information, wherein the plurality of shared processor resources are shared between a normal operating mode and the debug operating mode; executing instructions with the processor while in the debug operating mode; re-initializing the processor in response to a reset event; and preventing the reset event from re-initializing a predetermined portion of the debug configuration information in the plurality of shared processor resources. This allows processor debugging through reset events without losing the debug information.

20 Claims, 6 Drawing Sheets

| BIT(S) | NAME | DESCRIPTION | |
|---|---|---|---|
| 0 | EDM | EXTERNAL DEBUG MODE. THIS BIT IS READ-ONLY BY SOFTWARE.<br>0-EXTERNAL DEBUG MODE DISABLED. INTERNAL DEBUG EVENTS NOT MAPPED INTO EXTERNAL DEBUG EVENTS.<br>1-EXTERNAL DEBUG MODE ENABLED. EVENTS WILL NOT CAUSE THE CPU TO VECTOR TO INTERRUPT CODE. SOFTWARE IS NOT PERMITTED TO WRITE TO DEBUG REGISTERS {DBCRx, DBSR, DBCNT, IAC1-2, DAC1-2, DVC1-2}. | 52 |
| 1 | IDM | INTERNAL DEBUG MODE<br>0-DEBUG EXCEPTIONS ARE DISABLED. DEBUG EVENTS DO NOT AFFECT DBSR UNLESS EDM IS SET.<br>1-DEBUG EXCEPTIONS ARE ENABLED. ENABLED DEBUG EVENTS WILL UPDATE THE DBSR AND MAY CAUSE THE CPU TO VECTOR TO INTERRUPT CODE. SOFTWARE IS PERMITTED TO WRITE TO DEBUG REGISTERS. | 54<br><br>56 |
| 2:3 | RST | RESET CONTROL<br>00-NO FUNCTION<br>01-RESERVED<br>10-P_RESETOUT_B PIN ASSERTED BY DEBUG RESET CONTROL TO INITIATE PROCESSOR RESET.<br>11-SELECTIVE RESET CONTROL-BLOCK RESET OF DBCR0-3, IAC1-2, DAC1-2, DVC1-2, DBCNT ON P_RESET ASSERTION<br>NOTE: THIS FIELD IS UNCONDITIONALLY RESET ON ANY RESET CONDITION. | |
| 4 | ICMP | INSTRUCTION COMPLETE DEBUG EVENT ENABLE<br>0-ICMP DEBUG EVENTS ARE DISABLED<br>1-ICMP DEBUG EVENTS ARE ENABLED | 58 |
| 5 | BRT | BRANCH TAKEN DEBUG EVENT ENABLE<br>0-BRT DEBUG EVENTS ARE DISABLED<br>1-BRT DEBUG EVENTS ARE ENABLED | 60 |
| 6:7 | – | RESERVED | 61 |

*FIG. 4*

| BIT(S) | NAME | DESCRIPTION | |
|---|---|---|---|
| 8 | IAC1 | INSTRUCTION ADDRESS COMPARE 1 DEBUG EVENT ENABLE<br>0-IAC1 DEBUG EVENTS ARE DISABLED<br>1-IAC1 DEBUG EVENTS ARE ENABLED | 62 |
| 9 | IAC2 | INSTRUCTION ADDRESS COMPARE 2 DEBUG EVENT ENABLE<br>0-IAC2 DEBUG EVENTS ARE DISABLED<br>1-IAC2 DEBUG EVENTS ARE ENABLED | 64 |
| 10:11 | DAC1 | DATA ADDRESS COMPARE 1 DEBUG EVENT ENABLE<br>00-DAC1 DEBUG EVENTS ARE DISABLED<br>01-DAC1 DEBUG EVENTS ARE ENABLED ONLY FOR STORE-TYPE DATA STORAGE ACCESSES<br>10-DAC1 DEBUG EVENTS ARE ENABLED ONLY FOR LOAD-TYPE DATA STORAGE ACCESSES<br>11-DAC1 DEBUG EVENTS ARE ENABLED FOR LOAD-TYPE OR STORE-TYPE DATA STORAGE ACCESSES | 66 |
| 12:13 | DAC2 | DATA ADDRESS COMPARE 2 DEBUG EVENT ENABLE<br>00-DAC2 DEBUG EVENTS ARE DISABLED<br>01-DAC2 DEBUG EVENTS ARE ENABLED ONLY FOR STORE-TYPE DATA STORAGE ACCESSES<br>10-DAC2 DEBUG EVENTS ARE ENABLED ONLY FOR LOAD-TYPE DATA STORAGE ACCESSES<br>11-DAC2 DEBUG EVENTS ARE ENABLED FOR LOAD-TYPE OR STORE-TYPE DATA STORAGE ACCESSES | 68 |
| 14 | DCNT1 | DEBUG COUNTER 1 DEBUG EVENT ENABLE<br>0-COUNTER 1 DEBUG EVENTS ARE DISABLED<br>1-COUNTER 1 DEBUG EVENTS ARE ENABLED | 70 |
| 15 | DCNT2 | DEBUG COUNTER 2 DEBUG EVENT ENABLE<br>0-COUNTER 2 DEBUG EVENTS ARE DISABLED<br>1-COUNTER 2 DEBUG EVENTS ARE ENABLED | 72 |
| 16-31 | — | RESERVED | 73 |

*FIG. 5*

DEBUGGING A PROCESSOR THROUGH A RESET EVENT

BACKGROUND

1. Field

This disclosure relates generally to debugging methods and systems, and more specifically, to debugging a processor through a reset event.

2. Related Art

A processor initiated reset disables instruction breakpoints, data breakpoints, watchpoints, and any messaging related to these events. The processor typically disables these events to prevent unintended activity, including unexpected exceptions and unintended code paths. Following the reset, a debugging tool must re-initialize the resources, such as control registers related to instruction breakpoints, data breakpoints, watchpoints, and any messaging related to these events that were in use prior to the reset. The additional overhead associated with the re-initialization of the resources associated with these events can be problematic, since it perturbs the natural action of the system being debugged. Furthermore, in some instances, the debugging tool may not even be aware of a reset and hence may not even realize that it needs to re-initialize resources related to events, such as instruction breakpoints, data breakpoints, and watchpoints.

Accordingly, there is a need for debugging a processor through a reset event.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 shows, in a tabular form, functionality of a portion of the debug control register of FIG. 3B;

FIG. 5 shows, in a tabular form, functionality of a portion of the debug control register of FIG. 3B;

DETAILED DESCRIPTION

Figure 1:
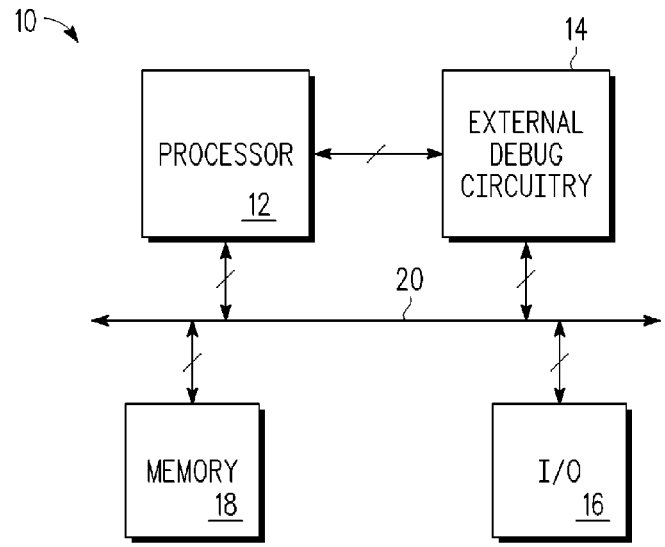
FIG. 1 is a block diagram of a data processing system.

Selective re-initializing of certain debug resources is provided, when it is determined that an external debugger or an emulator is active in a data processing system. The data processing system has a processor, which can operate in a debug operating mode or a normal mode. When the external debugger is active, debug resources shared between processor and the external debugger are placed under the exclusive control of the external debugger.

In one aspect, a method for operating a processor in a data processing system is provided. The method includes asserting a debug control signal to cause the processor to enter a debug operating mode. The method further includes initializing a plurality of shared processor resources with debug configuration information, wherein the plurality of shared processor resources are shared between a normal operating mode and the debug operating mode. The method further includes executing instructions with the processor while in the debug operating mode. The method further includes re-initializing the processor in response to a reset event. The method further includes preventing the reset event from re-initializing a predetermined portion of the debug configuration information in the plurality of shared processor resources.

In another aspect, a data processing system including a processor for executing instructions is provided. The data processing system further includes an internal debug unit coupled to the processor, the internal debug unit includes a debug control register having a plurality of control bits for storing debug configuration information for a plurality of resources that are shared between a debug operating mode and a normal operating mode. The internal debug unit further includes a reset control unit coupled to the debug control register for resetting the plurality of control bits of debug control register to an initial state in response to a reset event. The data processing system further includes external debug circuitry coupled to the internal debug unit, the external debug circuitry for controlling a debug operating mode of the processor in response to a debug mode bit of the debug control register being asserted, wherein when the debug mode bit is asserted, the reset control unit is blocked from resetting a predetermined portion of the plurality of control bits in response to a reset event.

In yet another aspect, a method for operating a processor in a data processing system is provided. The method includes initializing a processor of the data processing system to operate in a normal operating mode, wherein the processor is for executing instructions. The method further includes determining to debug the processor through a reset operation in response to a reset event. The method further includes asserting a debug control signal to cause the processor to enter a debug operating mode. The method further includes initializing a plurality of shared processor resources with debug configuration information, wherein the plurality of shared processor resources are shared between the normal operating mode and the debug operating mode. The method further includes executing instructions with the processor while in the debug operating mode. The method further includes re-initializing the processor in response to a reset event. The method further includes preventing the reset event from re-initialing a predetermined portion of the debug configuration information in response to asserting debug control signal.

FIG. 1 illustrates a data processing system 10 consistent with an embodiment of the invention. Data processing circuit may be a system-on-chip. Data processing system 10 may be implemented on a single integrated circuit or on a plurality of integrated circuits. Data processing system 10 includes a processor 12, an external debug circuitry 14, an I/O module 16, and a memory 18, which may be coupled via bus 20. In alternate embodiments, memory 18 may be any type of memory and may be located on the same integrated circuit as processor 12, or on a different integrated circuit than processor 12. Memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit.

Figure 2:
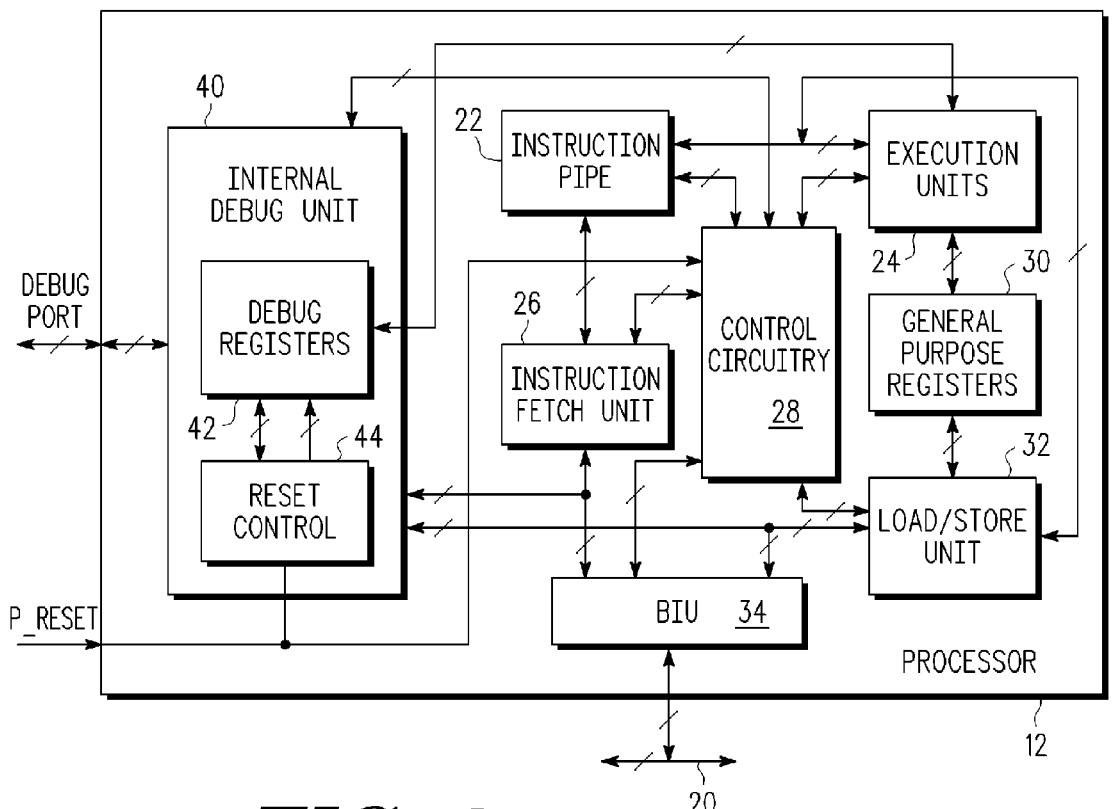
FIG. 2 is a block diagram of a processor associated with the data processing system of FIG. 1.

FIG. 2 is a block diagram of processor 12 associated with data processing system 10 of FIG. 1. Processor 12 may include an instruction pipe 22, execution units 24, instruction fetch unit 26, control circuitry 28, general purpose registers 30, load/store unit 32, bus interface unit (BIU) 34 and internal debug unit 40. Processor 12 may communicate with other components of data processing system 10 via bus 20 coupled to BIU 34. Internal debug unit 40 may be coupled to external debugging units, such as an IEEE ISTO-5001 compliant Nexus™ debugging unit via debug port shown in FIG. 2. Nexus™ is a trademark of Freescale Semiconductor, Inc. located in Austin, Tex. Debug port may be a serial interface, such as JTAG. Internal debug unit 40 may include debug registers 42 and reset control 44. Reset control 44 may provide selective reset control of the bits stored in debug registers 42. Debug registers 42 may include bits grouped in fields for controlling various debug related events, including instruction breakpoints, data breakpoints, watchpoints, and other messaging associated with debugging. These debugging resources may be shared between processor 12 and external debug circuitry 14.

Figure 3A:
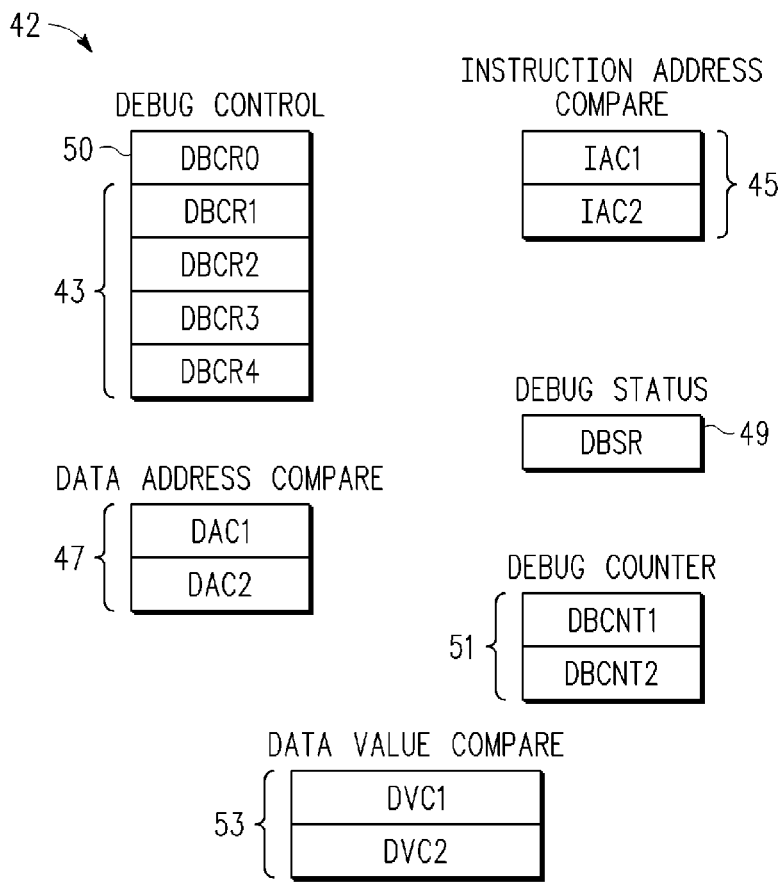
FIG. 3A is a diagram illustrating exemplary debug registers associated with the data processing system of FIG. 1.

Referring now to FIG. 3A, registers within debug registers 42 may also be provided for storing one or more address comparison values, address ranges, and data match values for implementing instruction and/or data access breakpoint and watchpoint events, and other debug control criteria. These address and data values, along with various control criteria, are used to determine when processor 12 accesses one or more predetermined instruction addresses or data addresses for the purpose of generating a breakpoint or watchpoint event, which can cause processor 12 to begin exception processing for a debug exception when internal debug mode is active, or cause processor 12 to enter a debug halted mode in which it responds to commands provided by external debug circuitry 14 through the debug port of internal debug unit 40 when external debug mode is active. By way of example, debug registers 42 may include various debug control registers, including debug control register 50 (DBCR0) and other debug control registers 43 (DBCR1, DBCR2, DBCR3, and DBCR4). Debug registers 42 may further include instruction address compare registers 45 (IAC1 and IAC2). Instruction address compare registers 45 may store instruction addresses for address comparison purposes. Debug registers 42 may further include data address compare registers 47 (DAC1 and DAC2). Data address compare registers 47 may store data access addresses for address comparison purposes. Debug registers 42 may further include debug status register 49, debug counters 51 (DBCNT1 and DBCNT2), and data value compare registers 53 (DVC1 and DVC2). Debug registers 42 may be a part of the user's software programming model. Debug counters 51 may be configured to count-down when one ore more count-enabled events occur. When a count value reaches zero, a debug count event may be signaled, and a debug event may be generated, if enabled. Data value compare registers 53 may store data values for data comparison purposes.

In internal debug mode, these register resources are managed by software, and no external debug circuitry usage is required. Software may configure the registers through data movement using move to and from special purpose register instructions which are programmers model software instructions to initialize the individual debug registers for performing software-based debugging activities, in which enabled debug events cause software debug interrupts to occur. A software interrupt handler may then perform various desired activity which is determined by the software programmer of data processing system 10. In external debug mode, external debug circuitry 14 is assigned ownership of these shared debug event configuration registers, and when a configured debug event occurs, processor 12 may enter a halted state and wait for a command to be provided by external debug circuitry 14. Software no longer has write access to the shared debug resources when external debug mode is enabled. External debug circuitry 14 may access the shared debug resources, including debug registers 42 directly via the debug port (as shown in FIG. 2), for example, a JTAG port. In one embodiment, debug registers 42 may be mapped as JTAG data registers with register selection encodings contained within one or more fields for the various JTAG instructions, which provide for read and write accesses to the registers by the debugger through JTAG IR and DR operations.

Sharing of a single set of registers requires fewer processor 12 resources to be implemented, and this simplifies the programming model for the user of data processing system 10. Internal debug unit 40 monitors activity within processor 12 and in response to detecting one or more predetermined conditions based on stored debug configuration information, may generate one or more data breakpoint events, instruction breakpoint events, instruction execution events such as a branch or trap taken event, an instruction completion event, and the like. In this manner of operation, processor 12 functions as can be appreciated by those skilled in the art.

Figure 3B:
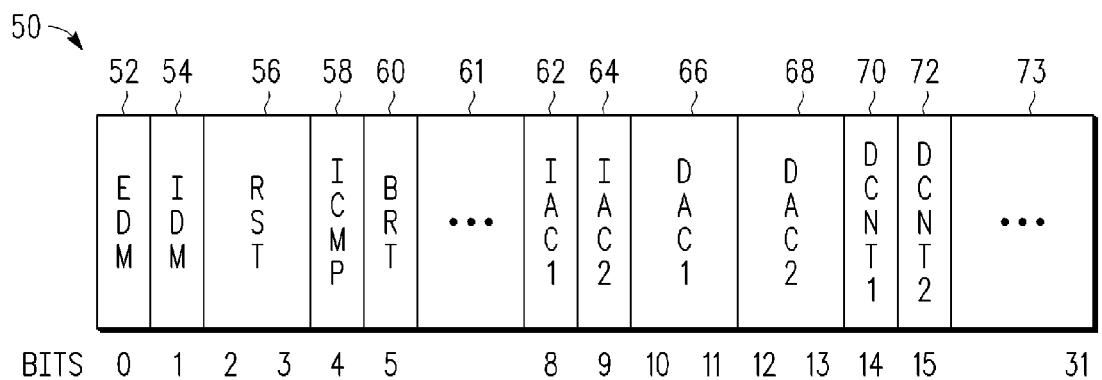
FIG. 3B is a diagram of a debug control register associated with the debug registers of FIG. 3A.

FIG. 3B is a diagram of a debug control register 50 associated with the data processing system of FIG. 1. Debug control register 50 may be included as part of debug registers 42, which may further comprise part of internal debug unit 40. Debug control register 50 may be used to store debug configuration information. Although FIG. 3B illustrates a specific embodiment of the present invention which uses specific bit fields, alternate embodiments of the present invention may use different bit fields having different numbers of bits in each field. The specific bit fields depicted in FIG. 3B are shown only for illustrative purposes. By way of example, debug control register 50 may include 32 bits. Debug control register 50 may include bit fields labeled as: EDM 52, IDM 54, RST 56, ICMP 58, BRT 60, IAC1 62, IAC2 64, DAC1 66, DAC2 68, DCNT1 70, and DCNT2 72. These bit fields are merely exemplary and debug control register 50 may include fewer or additional bit fields. In addition, these bit fields may be arranged differently. Debug control register 50 may also include reserved bit fields 61 and 73, which may be used in the future. The functionality of the various bit fields is explained with respect to FIGS. 4 and 5 below. By way of example, debug control register 50 may be a writeable register that may also be readable and which may be part of the user's software programming model. In alternate embodiments of the present invention, debug control register 50 may not be a control register in the user's software programming model, but instead may be implemented outside of the user's software programming model. Any type of storage circuitry may be used to implement debug control register 50.

FIG. 4 shows, in a tabular form, functionality of a portion of debug control register 50 of FIG. 3B. EDM bit 52 may indicate whether the external debug mode is enabled or disabled. When EDM bit 52 is set to 1, for example, control registers, such as debug control register 50 are placed under exclusive control of external debug circuitry 14 and data processing system 10 software cannot write information to these control registers. Alternatively, when EDM bit 52 is set to 1, software cannot write to specific portions of debug control registers. Thus, EDM bit 52 is used to selectively block certain reset events from clearing information stored in debug control register 50 and other debug resources, which may contain debug control and setup information. IDM bit 54 may indicate whether debug exceptions are enabled or disabled. RST bits 56 may be used to provide selective re-initializing of the debug control registers. In certain instances, RST bits 56 may be used to block re-initialization of debug control register 50. ICMP bit 58 may be used to indicate whether instruction complete debug events are enabled or disabled. BRT bit 60 may be used to indicate whether branch taken debug events are enabled or disabled. Bits 6:7 61 may be reserved for future use. With reference now to FIG. 5, FIG. 5 shows, in a tabular form, functionality of a portion of the debug control register 50 of FIG. 3B. IAC1 bit 62 may be used to indicate whether instruction address compare 1 debug events are enabled or disabled. IAC2 bit 62 may be used to indicate whether instruction address compare 2 debug events are enabled or disabled. DAC1 bits 66 may be used to indicate whether data address compare 1 debug events are enabled or disabled. DAC2 bits 68 may be used to indicate whether data address compare 2 debug events are enabled or disabled. DCNT1 bit 70 may be used to indicate whether debug counter 1 debug events are enabled or disabled. DCNT2 bit 72 may be used to indicate whether debug counter 2 debug events are enabled or disabled. Bits 16:31 may be reserved for future use. Although FIGS. 4 and 5 describe a specific number of bit fields for providing different configuration information associated with debug events, different number of bit fields than shown in these figures may also be used.

Figure 6:
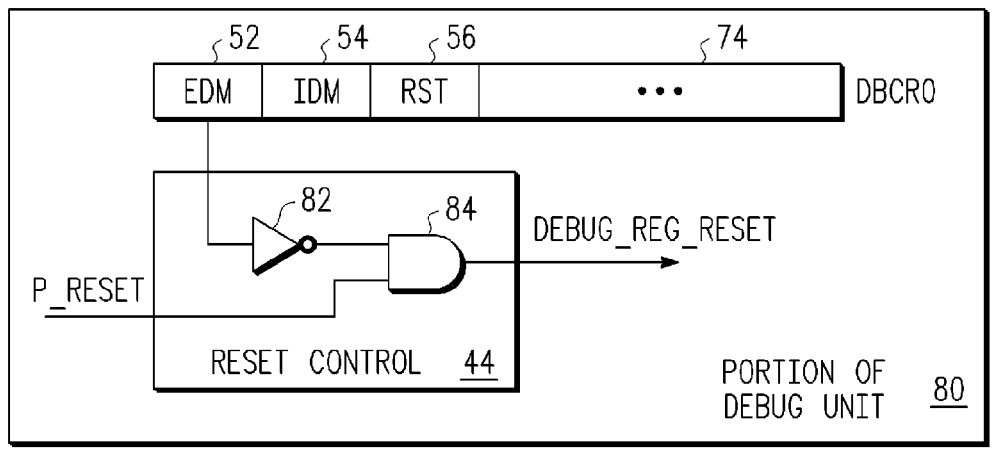
FIG. 6 is a block diagram of a portion of the internal debug unit associated with the processor shown in FIG. 2.

FIG. 6 is a block diagram of a portion 80 of internal debug unit 40 associated with processor 12 shown in FIG. 2. By way of example, portion 80 may include reset control 44. Reset control 44 may include an inverter 82 and an AND gate 84. The input of inverter 82 may receive a value corresponding to EDM bit 52, which may be part of debug control register 50, which is labeled as DBCR0 in FIG. 6. The output of inverter 82 may be subjected to a logic AND operation with the processor reset P_RESET signal. The output, labeled as DEBUG_REG_RESET of AND gate 84 may be used as a reset signal for re-initializing at least a portion of the debug configuration information, such as a portion of the bit fields stored in debug control register 50. FIG. 6 does not show all of the bit fields of debug control register 50, instead the bit fields not shown have been labeled as 74. In operation, when EDM bit 52 is set to 0, the P_RESET signal may be passed by AND gate 84 as DEBUG_REG_RESET signal, thus when a processor 12 reset is performed by asserting the P_RESET signal, at least a portion of debug configuration information stored within debug control register 50 is also reset. When, however, EDM bit 52 is set to 1, the P_RESET signal may not be passed by AND gate 84 as DEBUG_REG_RESET signal, and instead a low logic value may be output. This would prevent the P_RESET signal from re-initializing at least certain portions of the debug configuration information stored in debug control registers, for example. Portion 80 is merely exemplary and the functionality associated with this portion may be implemented using other components. In general, reset control 44 may have a logic gate having a first input to receive a control bit from debug control register 50, a second input coupled to receive P_RESET signal, and an output for providing a DEBUG_REG_RESET signal, such that the DEBUG_REG_RESET signal causes at least some of the control bits of debug control register 50 to be reset when the control bit and the DEBUG_REG_RESET signal have a predetermined logic value.

Figure 7:
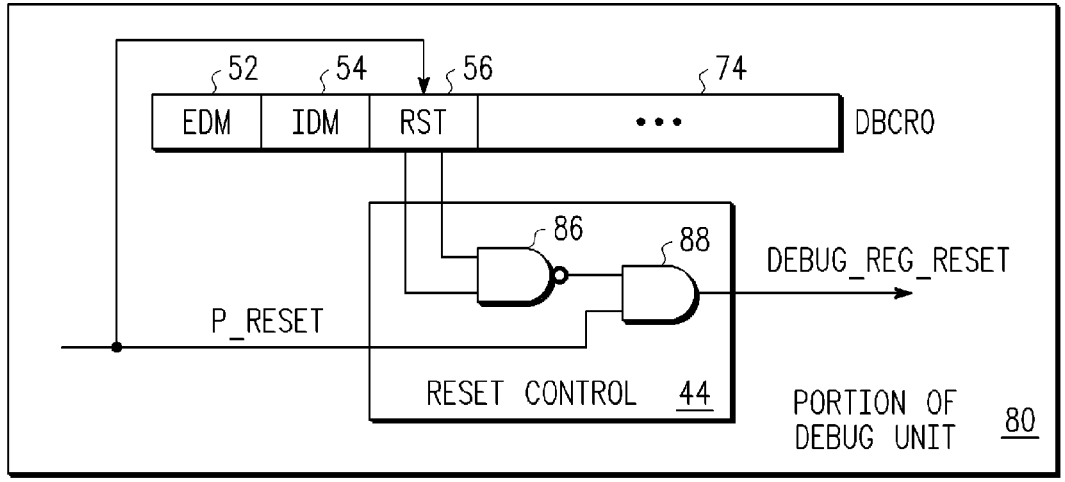
FIG. 7 is a block diagram of a portion of the internal debug unit associated with the processor shown in FIG. 2.

FIG. 7 is a block diagram of a portion 80 of internal debug unit 40 associated with processor 12 shown in FIG. 2. Portion 80 is merely exemplary and the functionality associated with this portion may be implemented using other components. By way of example, portion 80 may include reset control 44. Reset control 44 may include a NAND gate 86 and an AND gate 88. The inputs of NAND gate may receive a value corresponding to RST bits 56, which may be part of debug control register 50, which is labeled as DBCR0 in FIG. 7. The output of NAND gate 86 may be subjected to a logic AND operation with the processor reset P_RESET signal. The output, labeled as DEBUG_REG_RESET of AND gate 84 may be used as a reset signal for re-initializing at least a portion of the debug configuration information, such as a portion of the bit fields stored in debug control register 50. FIG. 7 does not show all of the bit fields of debug control register 50, instead the bit fields not shown have been labeled as 74. In operation, when RST bits 56 are set to 11, the output of NAND gate 86 is 0, which is coupled to an input of AND gate 88. This prevents the first occurrence of P_RESET signal from re-initializing a predetermined portion of debug control register 50. The first occurrence of P_RESET signal, however, changes RST bits 56 from a value of 11 to a value of 00 at the end of the first occurrence of the P_RESET signal. The next occurrence of P_RESET signal is thus passed by AND gate 88 as DEBUG_REG_RESET signal, which results in re-initialization of the predetermined portion of debug control register 50.

Figure 8:
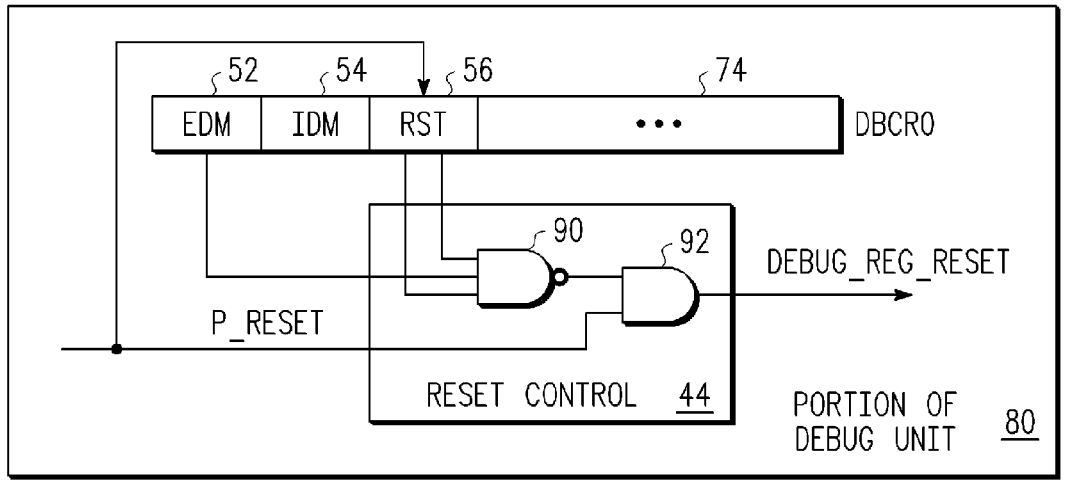
FIG. 8 is a block diagram of a portion of the internal debug unit associated with the processor shown in FIG. 2.

FIG. 8 is a block diagram of a portion 80 of internal debug unit 40 associated with processor 12 shown in FIG. 2. Portion 80 is merely exemplary and the functionality associated with this portion may be implemented using other components. By way of example, portion 80 may include reset control 44. Reset control 44 may include a NAND gate 90 and an AND gate 92. The three inputs of NAND gate 90 may receive values corresponding to RST bits 56 and a value corresponding to EDM bit 52. The output of NAND gate 90 may be subjected to a logic AND operation with the processor reset P_RESET signal. The output, labeled as DEBUG_REG_RESET of AND gate 92 may be used as a reset signal for re-initializing at least a portion of the debug configuration information, such as a portion of the bit fields stored in debug control register 50. FIG. 7 does not show all of the bit fields of debug control register 50, instead the bit fields not shown have been labeled as 74. In operation, when RST bits 56 are set to 11 and EDM bit 52 is set to 1, the output of NAND gate 86 is 0, which is coupled to an input of AND gate 88. This prevents the first occurrence of P_RESET signal from re-initializing a predetermined portion of debug control register 50. The first occurrence of P_RESET signal, however, changes RST bits 56 from a value of 11 to a value of 00 at the end of the first occurrence of the P_RESET signal. The next occurrence of P_RESET signal is thus passed by AND gate 92 as DEBUG_REG_RESET signal, which results in re-initialization of the predetermined portion of debug control register 50.

Figure 9:
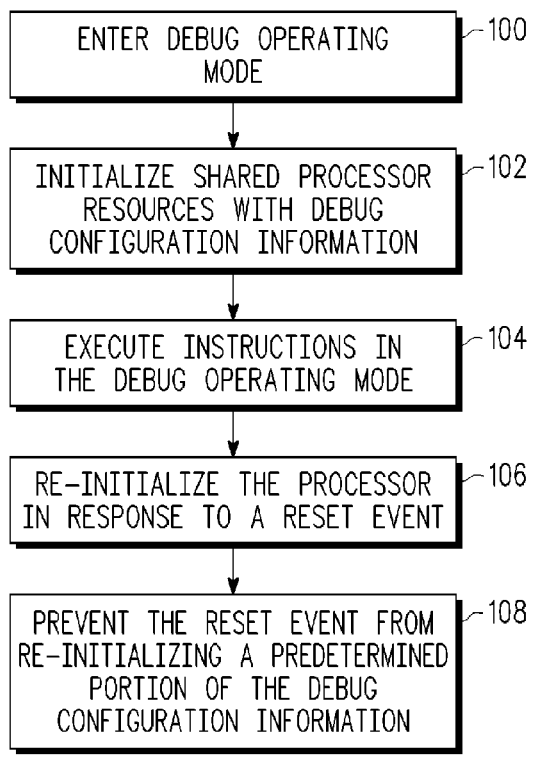
FIG. 9 is a flow chart for an exemplary method for operating a processor in a data processing system of FIG. 1.

FIG. 9 is a flow chart for an exemplary method for operating processor 12 as part of data processing system 10. By way of example, processor 12 may enter into a debug operating mode (step 100). This may occur in response to the assertion of a debug control signal from external debug circuitry 14, for example. Once processor 12 enters the debug operating mode, external debug circuitry 14 may initialize shared processor resources with debug configuration information (step 102). By way of example, external debug circuitry 14 may write values to various bit fields of debug control register 50 as well as other registers within debug registers 42 for the purpose of configuring one or more predetermined events to be detected. Next, processor 12 may execute instructions in debug operating mode (step 104).

While executing instruction in the debug mode, if a P_RESET signal is received by processor 12, then the processor may be re-initialized in response to this signal (step 106). However, in the debug operating mode, the reset event may be prevented from re-initialization of a predetermined portion of the debug configuration information (step 108). In particular, referring back to FIGS. 3A and 3B, in response to the reset event some of the bit fields of debug registers 42, including debug control register 50 may not be re-initialized. By way of example, IAC1 bit 62, IAC2 bit 64, DAC1 bits 66, DAC2 bits 68, DCNT1 bit 70, and DCNT2 bit 72 may not be re-initialized. This may be achieved by the use of exemplary portions of internal debug unit 40 shown in FIG. 2 and further explained with reference to FIGS. 6, 7, and 8. ICMP bit 58 and BRT bit 60, however, may be re-initialized. One skilled in the art would appreciate that the bit fields that are re-initialized and that are not re-initialized are merely given as an example. Additionally, other debug control/status information may also be selectively re-initialized or not re-initialized, such as information contained within debug registers 42 for storing the requisite configuration information associated with one or more debug events, such as instruction address comparison information associated with the IAC1 bit 62 and IAC2 bit 64 for instruction address compare debug events, data address comparison information and optionally, data value comparison information associated with the DAC1 bits 66 and DAC2 bits 68 for data address compare debug events, and debug counter information associated with debug counter event control bits DCNT1 bit 70 and DCNT2 bit 72.

Figure 10:
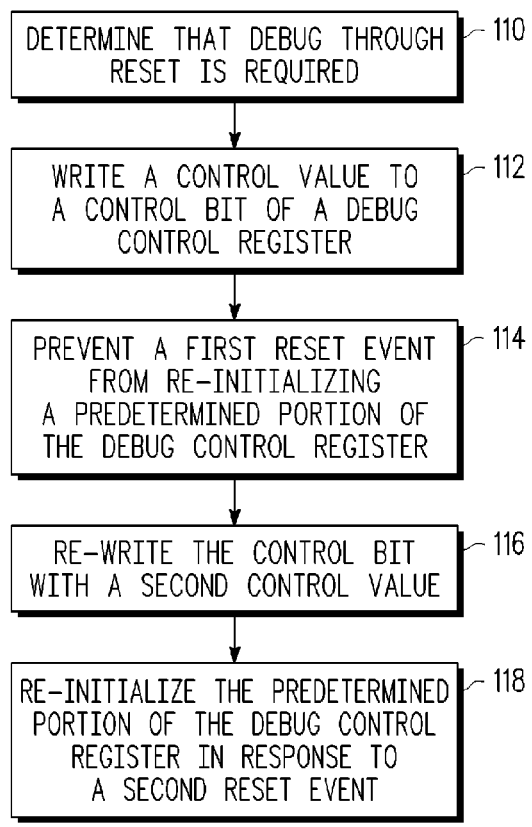
FIG. 10 is a flow chart for an exemplary method for operating a processor in a data processing system of FIG. 1.

FIG. 10 is a flow chart for an exemplary method for operating processor 12 as part of data processing system 10. By way of example, if processor 12 determines that a debug through reset is required (step 110), then using reset control 44, processor 12 may write a control value to at least one control bit of debug control register 50. For example, reset control 44 may write a 11 to RST bits 56. As a result of which, as explained above with respect to FIGS. 7 and 8, when P_RESET signal is asserted, a predetermined portion of debug control register 50 may not be re-initialized (step 114). Next, reset control 44 may write RST bits 56 (reset control bits) with a different value, for example, 00 (step 116). As a result of which, as explained above with respect to FIGS. 7 and 8, when P_RESET signal is asserted a subsequent time, the predetermined portion of debug control register 50 may be re-initialized (step 118). In this way, reset control 44 may be blocked from resetting the predetermined portion of debug control register 50 for only one reset event. Using other values for RST bits 56 or other control bits, reset control 44 may also be blocked from resetting the predetermined portion of debug control register 50 for a predetermined number of reset events exceeding one. In one embodiment, reset control 44 may write RST bits 56 with the different value (00, for example) in response to EDM bit 52 being set prior to the assertion of a subsequent P_RESET signal. In another embodiment, reset control 44 may write RST bits 56 with the different value (00, for example) in response to the receipt of the P_RESET signal.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 18 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a processor in a data processing system, the method comprising:
    asserting a debug control signal to cause the processor to enter a debug operating mode;
    initializing a plurality of shared processor resources with debug configuration information, wherein the plurality of shared processor resources are shared between a normal operating mode and the debug operating mode;
    executing instructions with the processor while in the debug operating mode;
    re-initializing the processor in response to a reset event; and
    preventing the reset event from re-initializing a predetermined portion of the debug configuration information in the plurality of shared processor resources by writing a first predetermined control value to at least one reset blocking control bit of a debug control register, preventing a first reset event from re-initializing the predetermined portion of the debug configuration information, re-writing the at least one reset blocking control bit with a second predetermined control value in response to the first reset event, and re-initializing the predetermined portion of the debug configuration information in response to a second reset event.

2. The method of claim 1, wherein said debug control register further comprises at least one debug exception enable bit to indicate whether debug exceptions are enabled or disabled.

3. The method of claim 1, wherein re-writing the at least one reset blocking control bit further comprises re-writing the at least one reset blocking control bit in response to the debug control signal being asserted prior to the second reset event.

4. The method of claim 1, wherein re-writing the at least one reset blocking control bit further comprises re-writing the at least one reset blocking control bit in response to the processor providing a reset control signal.

5. The method of claim 1, wherein the debug control signal is provided by a debug circuit that is external to the processor.

6. The method of claim 1, wherein the plurality of shared processor resources comprises instruction breakpoints, data breakpoints, and watchpoints.

7. The method of claim 1 further comprising initializing the processor to a predetermined state prior to entering the debug operating mode.

8. The method of claim 1 further comprising:
    determining to debug the processor through a reset operation in response to the reset event;
    asserting the debug control signal from a debug circuit that is external to the processor; and
    preventing the reset event from re-initialing the predetermined portion of the debug configuration information in response to the asserted debug control signal.

9. The method of claim 1, wherein the predetermined portion of the debug configuration information is less than all of the debug configuration information.

10. A data processing system comprising:
    a processor for executing instructions;
    an internal debug unit coupled to the processor, the internal debug unit comprising:
        a debug control register having a plurality of control bits for storing debug configuration information for a plurality of resources that are shared between a debug operating mode and a normal operating mode; and
        a reset control unit coupled to the debug control register for resetting the plurality of control bits of debug control register to an initial state in response to a reset event; and
    external debug circuitry coupled to the internal debug unit, the external debug circuitry for controlling a debug operating mode of the processor in response to a debug mode bit of the debug control register being asserted, wherein when the debug mode bit is asserted, the reset control unit is blocked from resetting a predetermined portion of the plurality of control bits in response to a reset event.

11. The data processing system of claim 10, wherein the plurality of resources include instruction breakpoints, data breakpoints, and watchpoints.

12. The data processing system of claim 10, wherein the reset control unit is blocked from resetting the predetermined portion of the plurality of control bits for only one reset event.

13. The data processing system of claim 10, wherein at least one bit of the plurality of control bits of the debug control register is set to block the predetermined portion of the plurality of control bits from being reset for a predetermined number of reset events.

14. The data processing system of claim 10, wherein the reset control unit comprises a logic gate having a first input coupled to receive a control bit of the debug control register, a second input coupled to receive a processor reset control signal, and an output for providing a debug register reset signal, wherein the debug register reset signal causes at least a portion of the plurality of control bits to be reset when the control bit and the debug register reset signal are each a predetermined logic value.

15. The data processing system of claim 10, wherein when the debug mode bit is de-asserted, the reset control unit resets all of the plurality of control bits in response to the reset event.

16. The data processing system of claim 10, wherein the data processing system is characterized as being a system-on-a-chip.

17. The data processing system of claim 10, wherein the predetermined portion of the plurality of control bits are for configuring one or more of instruction address compare events, one or more data address compare events, and a debug counter.

18. A method for operating a data processing system, the method comprising:
    initializing a processor of the data processing system to operate in a normal operating mode, wherein the processor is for executing instructions;
    determining to debug the processor through a reset operation in response to a reset event;
    asserting a debug control signal to cause the processor to enter a debug operating mode;
    initializing a plurality of shared processor resources with debug configuration information, wherein the plurality of shared processor resources are shared between the normal operating mode and the debug operating mode;
    executing instructions with the processor while in the debug operating mode;
    re-initializing the processor in response to a reset event; and
    preventing the reset event from re-initialing a predetermined portion of the debug configuration information in response to asserting the debug control signal by writing a first predetermined control value to at least one reset blocking control bit of a debug control register, preventing a first reset event from re-initializing the predetermined portion of the debug configuration information, re-writing the at least one reset blocking control bit with a second predetermined control value in response to the first reset event, and re-initializing the predetermined portion of the debug configuration information in response to a second reset event.

19. The method of claim 18, wherein said debug control register further comprises at least one branch taken debug bit to indicate whether branch taken debug events are enabled or disabled.

20. The method of claim 18, wherein the plurality of shared processor resources comprises instruction breakpoints, data breakpoints, and watchpoints.

* * * * *